(12) United States Patent
Wang et al.

(10) Patent No.: US 10,044,770 B2
(45) Date of Patent: Aug. 7, 2018

(54) METHOD AND APPARATUS FOR MANAGING A PLURALITY OF SESSIONS IN A MULTI-PATH ROUTING BASED NETWORK

(71) Applicant: Lenovo Enterprise Solutions (Singapore) Pte. Ltd., Singapore (SG)

(72) Inventors: Zhi X. Wang, Wuxi (CN); Jin R. Xu, Wuxi (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 532 days.

(21) Appl. No.: 14/094,703

(22) Filed: Dec. 2, 2013

(65) Prior Publication Data

US 2014/0181298 A1 Jun. 26, 2014

(30) Foreign Application Priority Data

Dec. 20, 2012 (CN) .......................... 2012 1 0558619

(51) Int. Cl.
*H04L 29/06* (2006.01)
*H04L 12/26* (2006.01)
(Continued)

(52) U.S. Cl.
CPC ...... *H04L 65/1069* (2013.01); *H04L 41/5022* (2013.01); *H04L 43/0811* (2013.01); *H04L 45/24* (2013.01); *H04L 47/726* (2013.01)

(58) Field of Classification Search
CPC ..... H04L 67/14; H04L 43/04; H04L 41/5022; H04L 43/0811; H04L 65/1069; H04L 45/24; H04L 47/726
See application file for complete search history.

(56) References Cited

U.S. PATENT DOCUMENTS 5,991,302 A * 11/1999 Berl .................. H04L 47/10
370/389
7,400,580 B1 7/2008 Synnestvedt et al.
(Continued)

FOREIGN PATENT DOCUMENTS

CN 101321081 A 12/2008
CN 102170660 8/2011
(Continued)

OTHER PUBLICATIONS

Villamizar et al., BGP Route Flap Damping, Nov. 1998, Network Working Group, Request for Comments 2439, pp. 3-6.*
(Continued)

*Primary Examiner* — Chris Parry
*Assistant Examiner* — Soe M Hlaing
(74) *Attorney, Agent, or Firm* — Zilka-Kotab, P.C.

(57) ABSTRACT

According to one embodiment, a method for managing a plurality of sessions is disclosed. The method includes advertising, by a node establishing the plurality of sessions, a session limit capability to peer nodes of the plurality, of sessions, determining priorities of the plurality of sessions, and selecting an optimal session from the plurality of sessions based on a session limit parameter and the determined priorities of the plurality of sessions, wherein the session limit parameter indicates the number of acceptable sessions for the node establishing the plurality of sessions. Additionally, a corresponding apparatus is also disclosed according to another embodiment.

18 Claims, 7 Drawing Sheets

(51) Int. Cl.
*H04L 12/24* (2006.01)
*H04L 12/911* (2013.01)
*H04L 12/707* (2013.01)

(56) References Cited

U.S. PATENT DOCUMENTS

| | | | |
|---|---|---|---|
| 7,508,772 B1 | 3/2009 | Ward et al. | |
| 8,320,371 B2* | 11/2012 | Grover | H04L 45/02 370/351 |
| 2002/0078223 A1* | 6/2002 | Baldonado | H04L 43/00 709/232 |
| 2004/0258090 A1* | 12/2004 | Sharafeddine | H04L 12/5695 370/468 |
| 2005/0190765 A1* | 9/2005 | Gotoh | H04L 12/1886 370/390 |
| 2006/0198322 A1* | 9/2006 | Hares | H04L 45/02 370/254 |
| 2006/0239186 A1* | 10/2006 | Wu | H04M 3/42374 370/229 |
| 2007/0121524 A1 | 5/2007 | Rangarajan et al. | |
| 2009/0046589 A1* | 2/2009 | Wang | H04L 41/5025 370/241 |
| 2013/0107712 A1* | 5/2013 | Allan | H04L 45/24 370/235 |

FOREIGN PATENT DOCUMENTS

| | | | |
|---|---|---|---|
| CN | 102469029 A | 5/2012 | |
| CN | 102571449 | 7/2012 | |
| JP | 2008225699 | 9/2008 | |
| WO | WO2011029241 | 3/2011 | |
| WO | WO2012041604 | 4/2012 | |

OTHER PUBLICATIONS

International Preliminary Examination Report from PCT Application No. PCT/CN2013/087465, dated Jul. 2, 2015.
International Search Report and Written Opinion from PCT Application No. PCT/CN2013/087465 dated Feb. 27, 2014.
Kushman et al., "Eliminating Packet Loss Caused by BGP Convergence," Jun. 11, 2011, pp. 1-19.
Decraene et al., "Requirements for the Graceful Shutdown of BGP Sessions," Internet Engineering Task Force (IETF), Apr. 2011, pp. 1-20.
Lee et al., "Impact Analysis of BGP Sessions for Prioritization of Maintenance Operations," CMU-CyLab-10-018, Carnegie Mellon University, Oct. 8, 2010, pp. 1-9.
Ermolinskiy et al., "Reducing Transient Disconnectivity Using Anomaly-Cognizant Forwarding," University of California, Berkeley, Sep. 18, 2008, pp. 1-6.
Butler et al., "A Survey of BGP Security Issues and Solutions," Proceedings of the IEEE, vol. 98, No. 1, Jan. 2010, pp. 100-122.
Office Action from Chinese Patent Application No. 201210558619.5, dated Jul. 6, 2016.

* cited by examiner

METHOD AND APPARATUS FOR MANAGING A PLURALITY OF SESSIONS IN A MULTI-PATH ROUTING BASED NETWORK

RELATED APPLICATIONS

The present application claims priority to Chinese Patent Application Serial No. 201210558619.5, filed Dec. 20, 2012, which is herein incorporated by reference.

BACKGROUND

The present invention relates to Multi-Path Routing technology, and more specifically, the present invention relates to a method and apparatus for managing a plurality of sessions in a Multi-Path Routing based network.

Multi-Path Routing technology, especially Equal Cost Multi-Path (ECMP) or Weighted Cost Multi-Path (WCMP) routing technology, may be widely used in dynamic routing protocol based Internet Protocol (IP) networks. The dynamic routing protocol may be classified as Interior Gateway Protocol (IGP) and Exterior Gateway Protocol (EGP). The Interior Gateway Protocol includes, for example, Open. Shortest Path First (OSPF) routing protocol, Intermediate System to Intermediate System (IS-IS) routing protocol, etc. The Exterior Gateway Protocol includes, for example, Border Gateway Protocol (BGP), etc.

In the Multi-Path Routing based IP network, there are multiple different links to the same destination address. An IP data packet may be routed to a destination node via at least one intermediate node by using one of the links. The connection between two nodes and the information exchange therebetween may be referred to as a session. When the IP network employs the ECMP or WCMP routing technology, the data packets may be transferred using the multiple links simultaneously, thus the transmission bandwidth may be increased, and the data transmission of the failed links may be backed up without time delay and packet loss.

Figure 2:
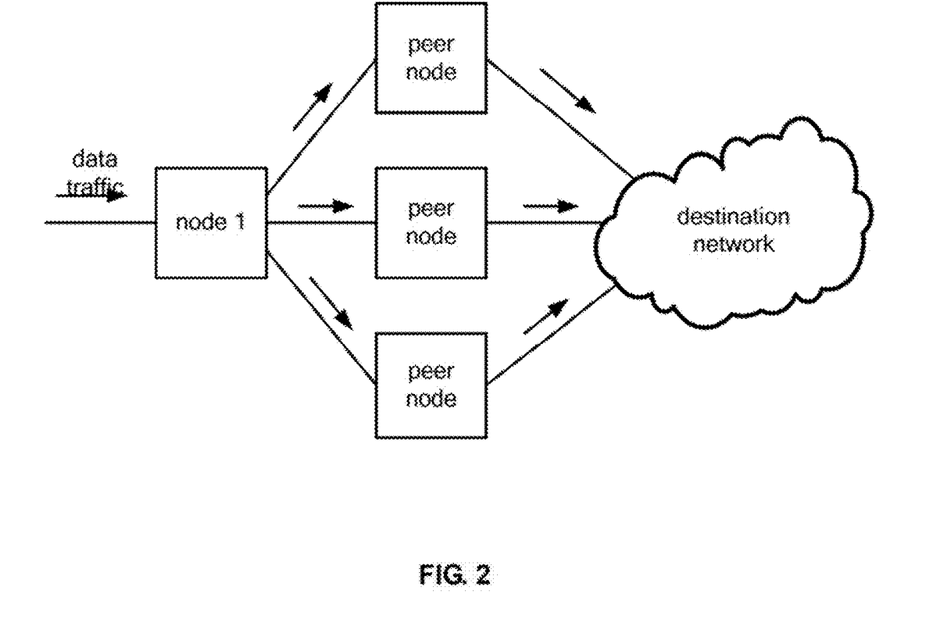
FIG. 2 is a diagram of an Equal Cost Multi-Path (ECMP) or Weighted Cost Multi-Path (WCMP) routing based Internet Protocol (IP) network.

FIG. 2 shows a diagram of a typical ECMP or WCMP routing based IP network. As shown in FIG. 2, the data traffic may reach the destination network from node 1 via a plurality of intermediate nodes. The node 1 may establish, a plurality of ECMP or WCMP sessions to the plurality of intermediate nodes, and these sessions are established on the individual link respectively. However, due to a topology problem of the IP network or a hardware or software problem of routers, it ray occur where some protocol interfaces or physical ports will fail and then be restored (a flapping of a link), which in turn will cause the flapping of the session. In the ECMP or WCMP routing based IP network, IP data traffic may use a plurality of ECMP or WCMP sessions simultaneously. Even if the flapping occurs in the ECMP or WCMP session, the IP data traffic will still use the flapped ECMP or WCMP session. Thus, when the flapping occurs in the ECMP or WCMP session, it may cause the loss of the IP data packets.

To reduce the loss of IP data packets, a trunk containing the multiple links may be used between the nodes in the IP network as shown in FIG. 2, for example. In this case, the ECMP or WCMP session may be maintained as long as one link is available. However, in some cases, the data packets will still be lost, if the trunk fails or is being blocked, the loss of the data packets will occur. Furthermore, if the IP data traffic is mapped to an unstable link in the trunk via a hash algorithm, when the flapping occurs in the unstable link, there will also be the flapping in the ECMP or WCMP session, thereby resulting in the loss of data packets.

SUMMARY

According to one embodiment, a method for managing a plurality of sessions is provided, which includes advertising, by a node establishing the plurality of sessions, a session limit capability to peer nodes of the plurality of sessions, determining priorities of the plurality of sessions, and selecting an optimal session from the plurality of sessions based on a session limit parameter and the determined priorities of the plurality of sessions, wherein the session limit parameter indicates the number of acceptable sessions for the node establishing the plurality of sessions.

According to another embodiment, an apparatus for managing a plurality of sessions is provided, the apparatus including an advertisement module configured to advertise a session limit capability to peer nodes of the plurality of sessions, a priority determination module configured to determine priorities of the plurality of sessions, and a selection module configured to select an optimal session from the plurality of sessions based on a session limit parameter and the determined priorities of the plurality of sessions, wherein the session limit parameter indicates the number of acceptable sessions for the node establishing the plurality of sessions.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure may be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

According to one general embodiment, a method for managing a plurality of sessions is provided, which includes advertising, by a node establishing the plurality of sessions, a session limit capability to peer nodes of the plurality of sessions, determining priorities of the plurality of sessions, and selecting an optimal session from the plurality of sessions based on a session limit parameter and the determined priorities of the plurality of sessions, wherein the session limit parameter indicates the number of acceptable sessions for the node establishing the plurality of sessions.

According to another embodiment, an apparatus for managing a plurality of sessions is provided, the apparatus including an advertisement module configured to advertise a session limit capability to peer nodes of the plurality of sessions, a priority determination module configured to determine priorities of the plurality of sessions, and a selection module configured to select an optimal session from the plurality of sessions based on a session limit parameter and the determined priorities of the plurality of sessions, wherein the session limit parameter indicates the number of acceptable sessions for the node establishing the plurality of sessions.

As will be appreciated by one skilled in the art, aspects of the present invention may be embodied as a system, method, and/or computer program product. Accordingly, aspects of the present invention may rake the form of an entirely hardware embodiment, an entirely software embodiment (including firmware, resident software, micro-code, etc.) and/or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
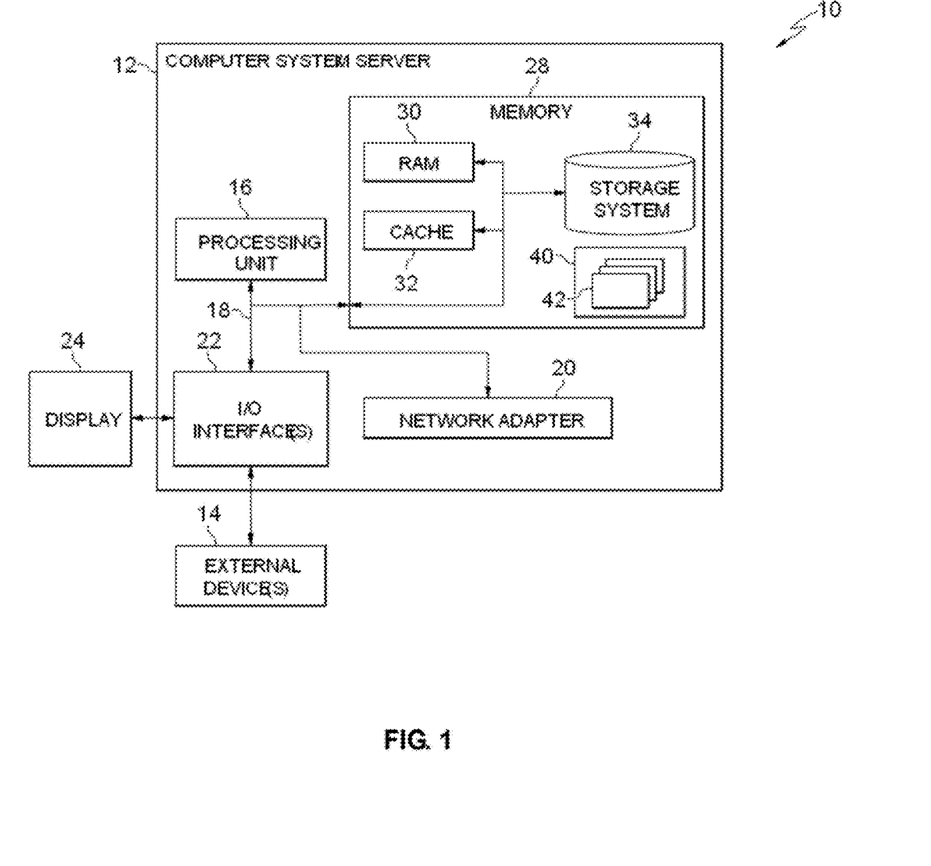
FIG. 1 shows a block diagram of an exemplary computer system/server applicable to implement some embodiments.

FIG. 1 shows a block diagram of an exemplary computer system/server 12 which is applicable to implement the embodiments described herein. The computer system/server 12 shown in FIG. 1 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media may be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components may be used in conjunction with computer system/server 12. Examples, include, but are not limited to: microcode, device drivers, redundant processing units, external disk drive arrays, RAID systems, tape drives, and data archival storage systems, etc.

Figure 3:
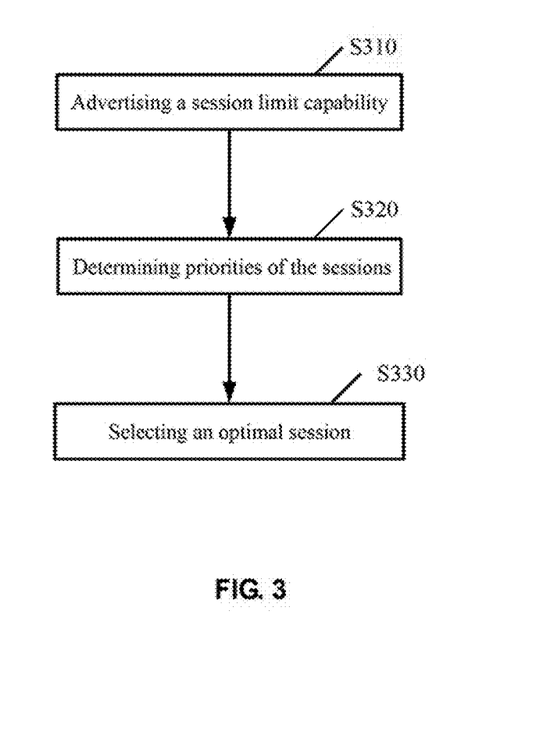
FIG. 3 is a flowchart of a method for managing a plurality of sessions in a Multi-Path Routing based network according to one embodiment.

FIG. 3 is a flowchart of the method of managing a plurality of sessions in a Multi-Path Routing based network according to one embodiment. The embodiment will be described below in detail in conjunction with accompany drawings.

The method of the present embodiment relates to management of a plurality of sessions by a node establishing the sessions with a plurality of peer nodes. The plurality of sessions may be ECMP or WCMP based sessions or any sessions that may simultaneously route data traffic to the same destination address.

As shown in FIG. 3, at step S310, the node which establishes a plurality of sessions advertises a session limit capability to the peer nodes of the plurality of sessions. The session limit capability may be used to indicate a capability that a node may limit a session.

Figure 4:
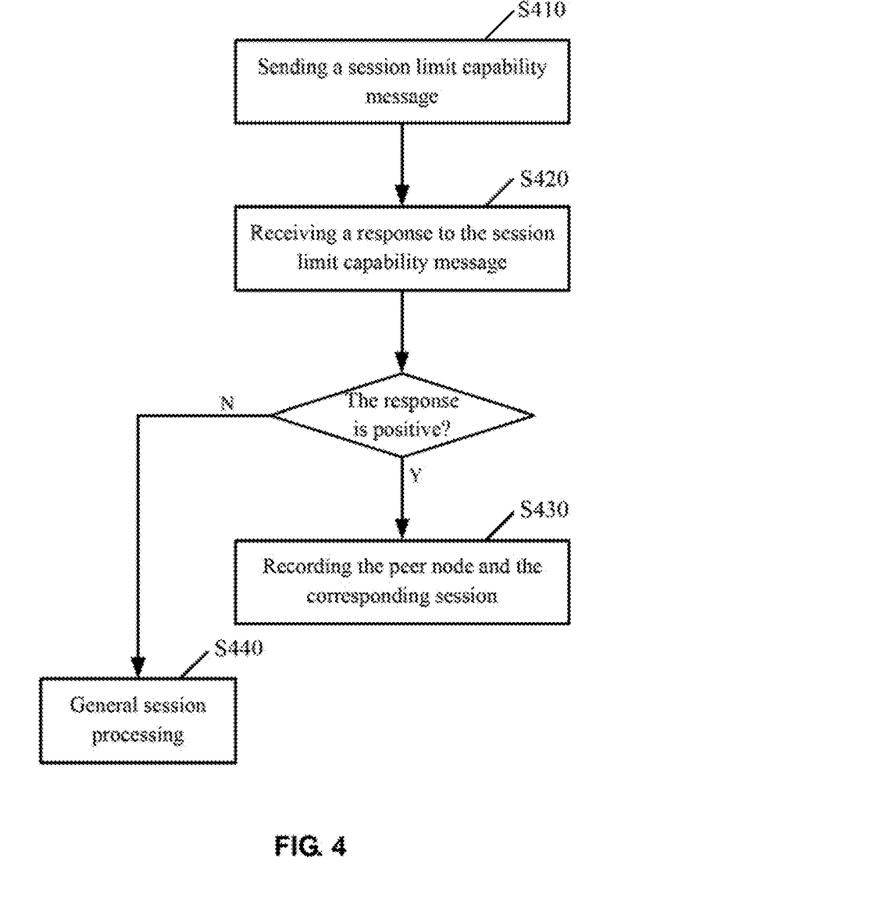
FIG. 4 is a schematic flowchart of a step of advertising a session limit capability according to one embodiment shown in FIG. 3.

The step S310 will be described below in detail in conjunction with FIG. 4. As shown in FIG. 4, at step S410, the node sends a session limit capability message to the plurality of peer nodes respectively. In this embodiment, the session limit capability message may at least include an indicator indicating the session limit capability of the node. Alternatively, the session limit capability message may also include parameters such as a session limit parameter indicative of the number of acceptable sessions, the number of current sessions, etc. The session limit parameter may be configured by a user or an administrator, and the number of current sessions is sum of number of the currently established plurality of sessions.

Figure 5:
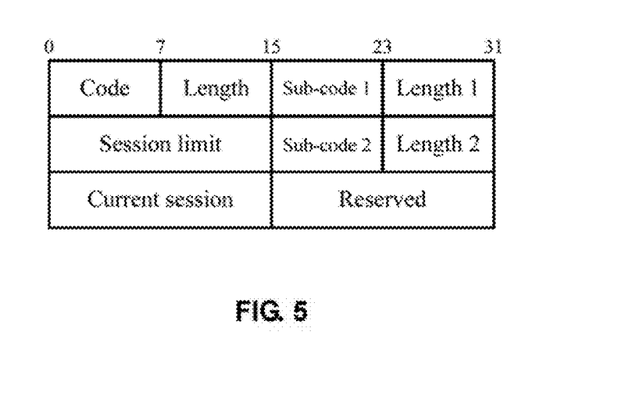
FIG. 5 is a diagram illustrating a format of a session limit capability message, in one embodiment.

In one embodiment, first, the node accepts the configuration of the session limit parameter made by the user or the administrator. Then, the node may generate the session limit capability message. FIG. 5 illustratively shows a diagram of a format of the session limit capability message. As shown in FIG. 5, the session limit capability message may include "code," "length," "sub-code 1," "sub-code 2," "session limit," "current session," "length 1," "length 2," and "reserved" fields. The "code" field may be used as an indicator uniquely indicating the session limit capability, which may be 8 bits. The "length" field may be used to indicate the length of the session limit capability message, which may be 8 bits. The "sub-code 1" field may be used to identify a feature of the session limit capability, such as the session limit parameter. The "sub-code 2" field may be used to identify a feature of the current sessions, such as the number of the current sessions. The lengths of the "sub-code 1" and "sub-code 2" fields may be both 8 bits. The "session limit" field may be used to indicate a threshold of the number of acceptable sessions, which may be 16 bits. The "current session" field may be used to indicate the actual number of the currently established sessions, which may be 16 bits. The "length 1" field and "length 2" field represent the length of the "session limit" field and the "current session" field respectively, and the length of both fields may be 8 bits. The "reserved" field may be a 16-bit field, and it is set to 0 when sending the session limit capability parameter and is ignored when receiving the session limit capability parameter.

Although FIG. 5 shows an example of the session limit capability message, it is readily appreciated by those skilled in the art that the session limit capability message may also include other parameters or use other formats.

After the session limit capability message is generated, the node may send the session limit capability message to the plurality of peer node respectively. The session limit capability message may be sent during session initialization or be sent after the sessions have been established. During the session initialization, the session limit capability message may be sent using an initial CAPABILITY message. For example, in the BGP protocol based network, the session limit capability message may be sent to the peer nodes as a part of OPEN message of the BGP protocol. After the sessions have been established, when there is a need to manage the sessions or there is a change in the parameter value in the session limit capability message, the session limit capability message may be sent using a dynamic CAPABILITY message. For example, in the BGP protocol based network, the session limit capability message may be sent to the peer nodes as a part of UPDATE message of the BGP protocol.

Then, at step S420, the node receives from the peer nodes responses to the sent session limit capability message. If the response from the peer node is positive, that is, the peer node accepts the session limit capability message, which indicates that the peer node supports the session limit, at step S430, the corresponding peer node and the corresponding session are recorded. Then, the session management is performed on the recorded session. If the response from the peer node is negative, that is, the peer node does not accept the session limit capability message, which indicates that the peer node does not support the session limit, at step S440, the session management is not performed on the session between the node and the corresponding peer node, and the general session management will be performed.

For ease of explanation, it is assumed in the following description that, all of the peer nodes of the plurality of sessions established by the node support the session limit.

Returning to FIG. 3, after the session limit capability is advertised to the peer nodes, at step S320, the node determines the priorities of the plurality of sessions. In this embodiment, the priority of the session is used to reflect the stability of the session. The higher the priority is, the more stable the session is, and on the contrary, the lower the priority is, the less stable the session is.

Figure 6:
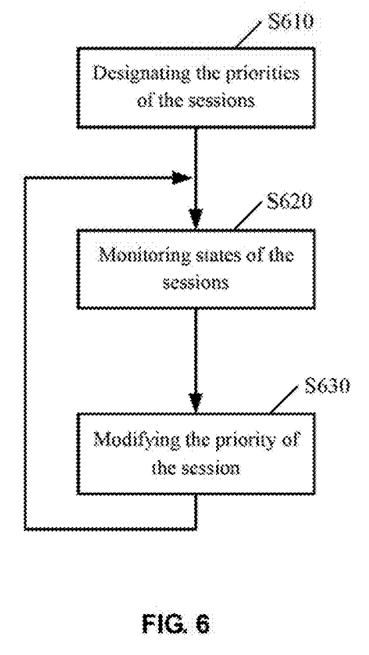
FIG. 6 is a schematic flowchart of a step of determining priorities of sessions according to one embodiment shown in FIG. 3.

FIG. 6 shows a schematic flowchart of the step S320, in one embodiment. As shown in FIG. 6, at step S610, the priority of each of the plurality of sessions is designated. In this embodiment, the priority of each session may be initially designated as the highest priority. Then, at step S620, the states of the sessions are monitored. At step S630, the priority of the session is modified based on a change in the monitored state of the session. In one embodiment, it may be monitored whether a flapping occurs in the session. As stated above, when the flapping occurs in the session, the stability of the session will accordingly be decreased. Thus, when it is monitored that the flapping occurs in a session, the priority of the session in which the flapping occurs will be decreased. Each time when a session is monitored to have the flapping, the priority of the session will be decreased by one. If there is no flapping in a session, the priority of the session will be maintained, and when a time period during which the flapping does not occur in the session exceeds a predetermined time period, the priority of the session will be increased. The stability of the session may be reflected in real time by continuously monitoring the state of the session and modifying the priority thereof accordingly.

In another embodiment, after the priorities of the plurality of sessions are determined, the sessions may also be ordered using session queues. Specifically, first, multiple session queues can be established, and each session queue has its priority corresponding to the priority of session. For example, there are N levels for the priority of session, accordingly, there are also N levels for the priority of session queue. Next, the session with the priority can be added into the session queue with the corresponding priority. In this way, the session queue with priority "n" will include all the sessions with priority "n." In the same session queue, the sessions are ordered by the time at which each session enters into the session queue.

Figure 7:
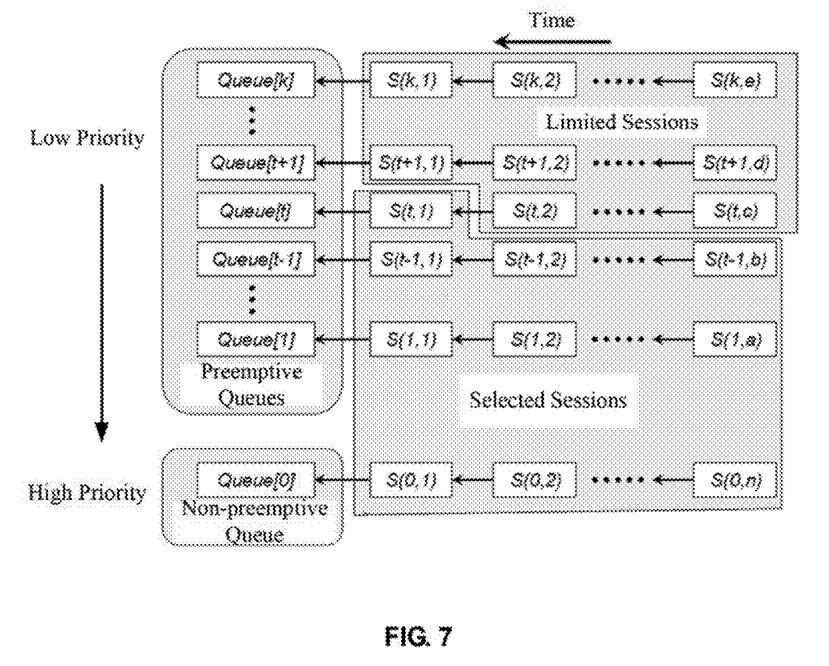
FIG. 7 is a diagram illustrating an exemplary embodiment of session queues.

FIG. 7 shows a diagram of an exemplary embodiment of ordering the sessions using the session queues. In FIG. 7, (k+1) session queues are shown, which correspond to (k+1) priorities respectively. In the (k+1) session queues, the session queue Queue[0] has the highest priority, and the session queue Queue[k] has the lowest priority. Each session queue includes a plurality of sessions S(i,j), wherein i represents a session queue number, and j represents a session number. Within each session queue, the sessions are ordered by the time at which each session enters into the session queue. For example, there are "c" sessions in session queue Queue[1], wherein the session S(t,1) is the first to enter into the session queue, and the session S(t,c) is the last to enter into the session queue. In this exemplary embodiment, the session queue Queue[0] may be configured as a non-preemptive queue, and the sessions S(0,1), S(0,2), . . . , S(0,n) contained therein become non-preemptive sessions and cannot be preempted. Other session queues may be configured as preemptive queues, and the sessions contained therein become preemptive sessions and can be preempted. In another exemplary embodiment, it is also possible to configure a part of (k+1) session queues as the non-preemptive queue, and to configure the other part of (k+1) session queues as the preemptive queue.

Returning to FIG. 3, after the priorities of the plurality of sessions are determined, at step S330, the node selects an optimal session from the plurality of sessions based on the session limit parameter and the determined priorities of the plurality of sessions.

Figure 8:
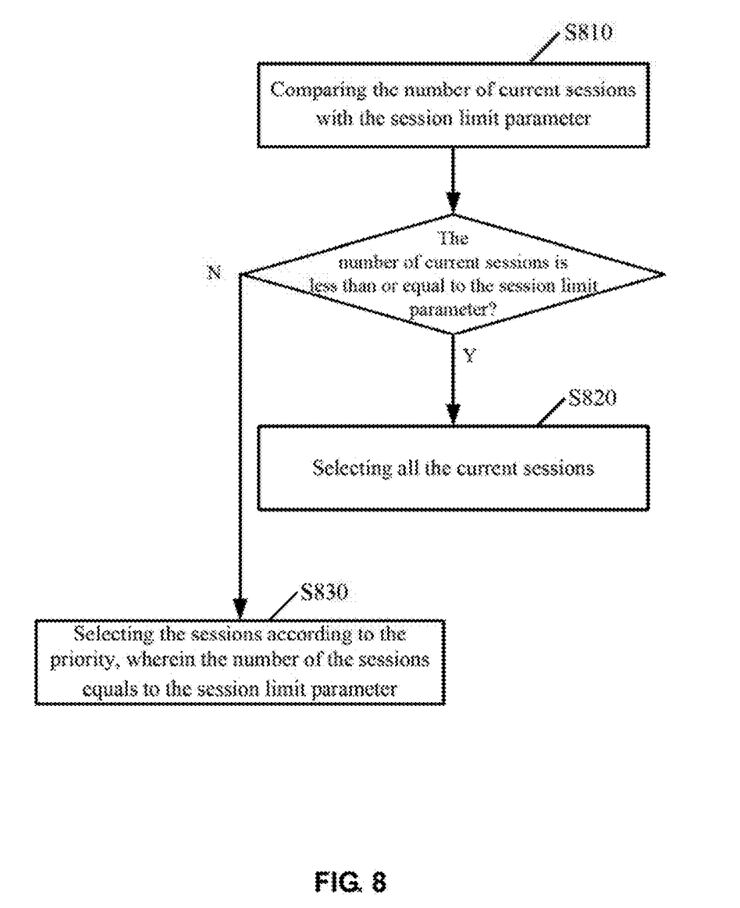
FIG. 8 is a schematic flowchart of one embodiment of a step of selecting an optimal session according to one embodiment shown in FIG. 3.

FIG. 8 shows a schematic flowchart of one embodiment of the step S330. As shown in FIG. 8, at step S810, the node compares the number of current sessions with the session limit parameter. If the number of current sessions is less than or equal to the session limit parameter, it is indicated that all the current sessions will not be limited, thus, at step S820, the node selects all the current sessions as the optimal sessions. If the number of current sessions is greater than the session limit parameter, at step S830, the node selects, from the plurality of sessions, the sessions as the optimal session in an order from high priority to low priority, wherein the number of the selected sessions equals to the session limit parameter. The remaining session will be limited. The remaining sessions may be turned off or invalidated.

In case that the sessions are ordered using the session queues, the selection begins from the session queue with the highest priority, and within the same session queue, the session that enters into the session queue earlier will be preferably selected. In the example as shown in FIG. 7, assume the session limit parameter is (n+a+b+1), the selection begins from the session queue Q[0] with the highest priority, and all the sessions in the session queues Q[0], Q[1], ..., Q[t−1] and the session S(t,1) in the session queue Q[t] will be selected as the optimal sessions, and the remaining session will be limited.

Figure 9:
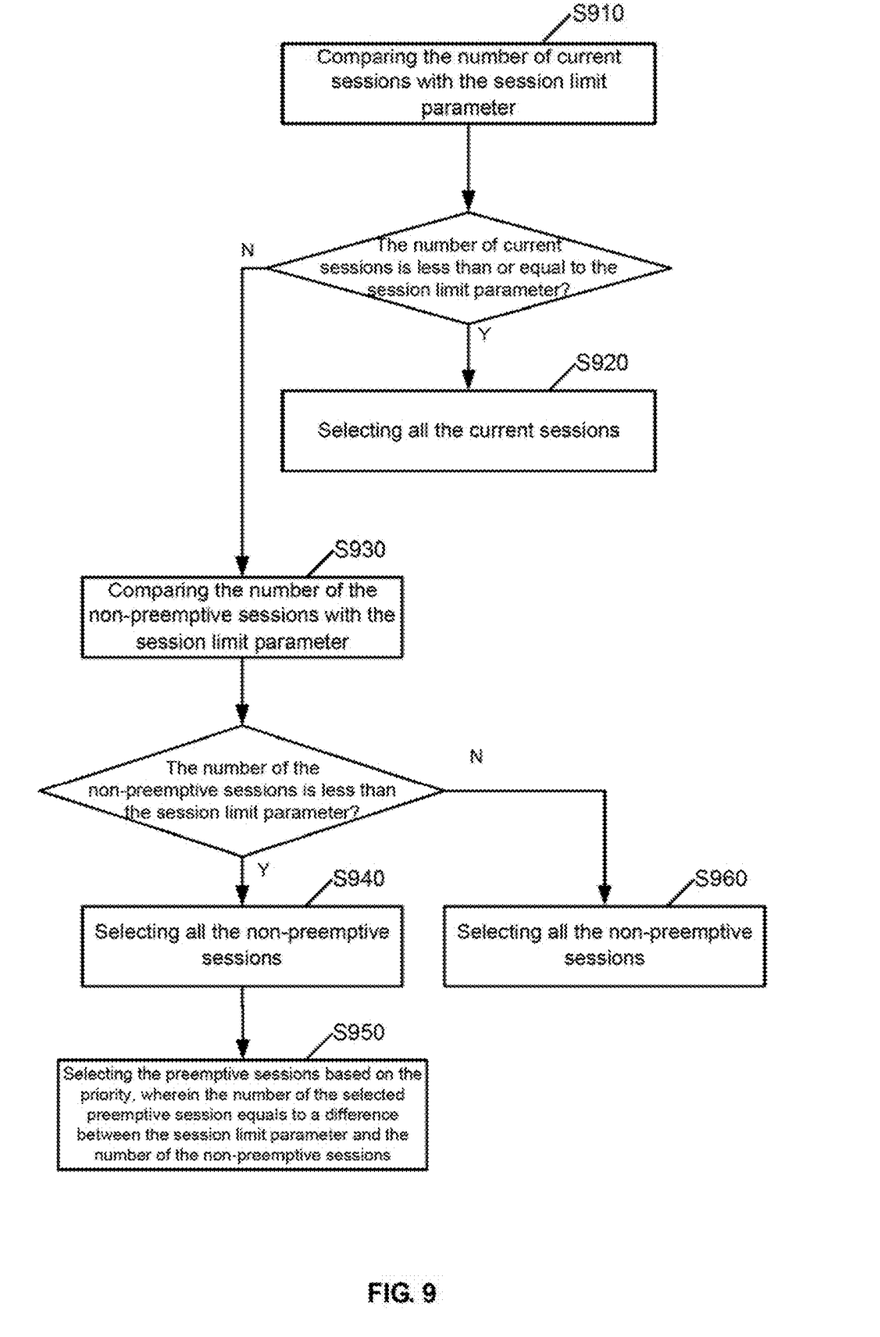
FIG. 9 is a schematic flowchart of another embodiment of the step of selecting an optimal session according to one embodiment shown in FIG. 3.

FIG. 9 shows a schematic flowchart of another embodiment of the step S330. This embodiment is applicable to the case where a part of the plurality of sessions is configured as the non-preemptive session and the other part of the plurality of sessions is configured as the preemptive session.

As shown in FIG. 9, steps S910 and S920 are the same as steps S810 and S820 in FIG. 8. In the comparison of step S910, if the number of current sessions is greater than the session limit parameter, at step S930, the number of the non-preemptive sessions is further compared with the session limit parameter. If the number of the non-preemptive sessions is less than the session limit parameter, at step S940, all the non-preemptive sessions are selected as a part of the optimal sessions. At step S950, the preemptive sessions are selected in an order from high priority to low priority as another part of the optimal sessions, wherein the number of the selected preemptive sessions equals to a difference between the session limit parameter and the number of the non-preemptive sessions. The remaining preemptive sessions will be limited. If the number of the non-preemptive sessions is greater than or equal to the session limit parameter, at step S960, all the non-preemptive sessions are selected as the optimal sessions.

During the session management, if a new session is established or an existing session is turned off, the number of current session will be increased or decreased. The changed session limit capability parameter will be advertised to the peer nodes and the session management will be subsequently performed.

It can be seen from the above description that, by limiting and controlling a plurality of sessions in the Multi-Path Routing based network, the method of the present embodiment is capable of preserving the stable sessions in the plurality of sessions and preventing data traffic from being routed via the unstable sessions, so as to make the network more stable and reliable, and is capable of reducing the loss of data packets.

Figure 10:
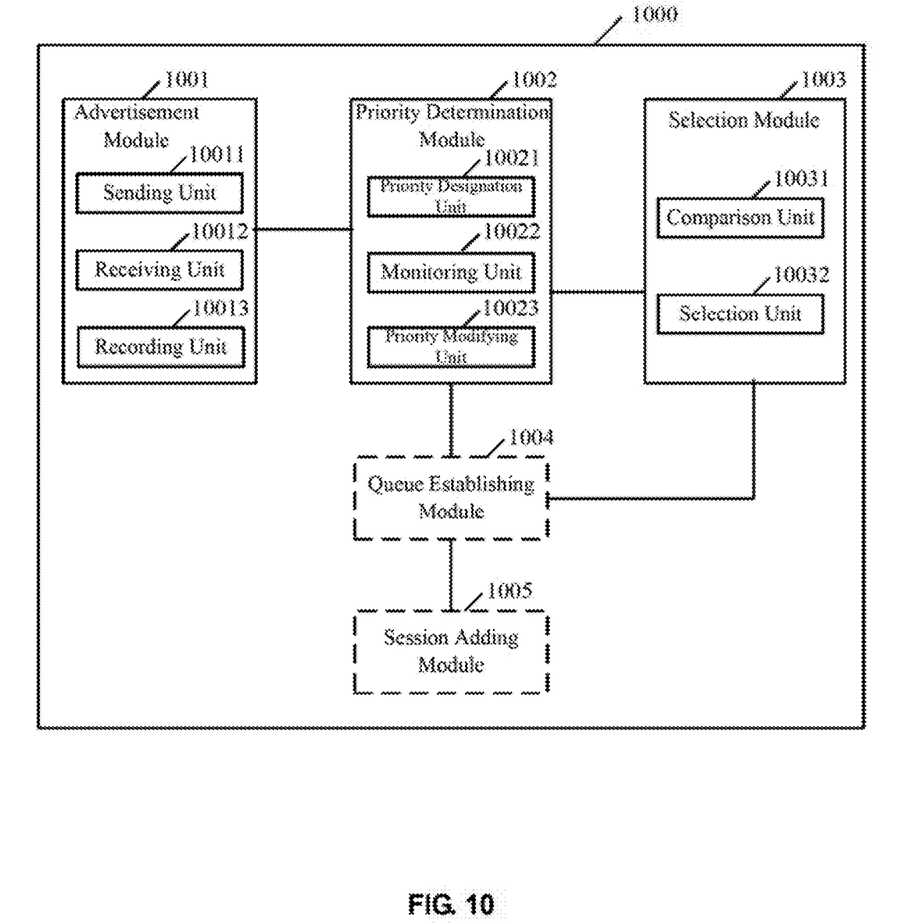
FIG. 10 is a schematic block diagram of an apparatus for managing a plurality of sessions in a Multi-Path Routing based network according to one embodiment.

Under the same inventive concept, FIG. 10 is a schematic block diagram of the apparatus 1000 of managing a plurality of sessions in a Multi-Path Routing based network according to one embodiment. This embodiment will be described below in detail in conjunction with accompany drawings, and for the same parts as those of the previous embodiments, their description will be properly omitted.

In this embodiment, a plurality of sessions is established between the apparatus 1000 and a plurality of peer nodes. The plurality of sessions may be ECMP or WCMP based sessions or any sessions that can simultaneously route data traffic to same destination address.

As shown in FIG. 10, the apparatus 1000 comprises: an advertisement module 1001 configured to advertise a session limit capability to the peer nodes of the plurality of sessions; a priority determination module 1002 configured to determine priorities of the plurality of sessions; and a selection module 1003 configured to select an optimal session from the plurality of sessions based on a session limit parameter and the determined priorities of the plurality of sessions.

In the apparatus 1000, the advertisement module 1001 may advertise the session limit capability to the peer nodes of the plurality of sessions. In the advertisement module 1001, a sending unit 10011 may send a session limit capability message to the peer nodes respectively. The session limit capability message may at least include an indicator indicating the session limit capability of the node. Optionally, the session limit capability message may also include the session limit parameter. The sending unit 10011 may send the session limit capability message using an initial CAPABILITY message during session initialization or using a dynamic CAPABILITY message after the sessions have been established. Then, a receiving unit 10012 may receive from the peer nodes the responses to the session limit capability message. If the response from the peer node is positive, that is, the peer node support the session limit, a recording unit 10013 may record the peer node with the response being positive and the session thereof. If the response from the peer node is negative, that is, the peer node does not support the session limit, the session management is not performed on the session between the node and the peer node.

After the advertisement module 1001 advertises the session limit capability to the peer nodes and obtains the positive responses from the peer nodes, the priority determination module 1002 determines the priorities of the plurality of sessions. In this embodiment, the priority of the session reflects the stability of the session. In the priority determination module 1002, a priority designation unit 10021 may designate the priorities for the plurality of sessions. Initially, the priority of the session may be designated as the highest priority. Then a monitoring unit 10022 may monitor the states of the plurality of sessions. For example, the monitoring unit 10022 may monitor whether a flapping occurs in the plurality of sessions. As noted above, when there is the flapping in the session, the stability of the session will be affected. Based on the change in state of the session monitored by the monitoring unit 10022, a priority modifying unit 10023 may modify the priority of the session. Specifically, when the monitoring unit 10022 monitors that the flapping occurs in the session, the priority modifying unit 10023 will decrease the priority of the session in which the flapping occurs. When the monitoring unit 10022 monitors that the flapping does not occur in the session for a predetermined time period, the priority modifying unit 10023 will increase the priority of the session.

Then, the selection module 1003 selects the optimal session based on the session limit parameter and the priorities of the sessions determined by the priority determination module 1002. In the selection module 1003, a comparison unit 10031 compares the number of current sessions with the session limit parameter. When the number of current sessions is less than or equal to the session limit parameter, a selection unit 10032 selects all the current sessions as the optimal sessions. When the number of current sessions is greater than the session limit parameter, the selection unit 10032 selects the sessions as the optimal sessions in an order from high priority to low priority, wherein the number of the selected sessions equals to the session limit parameter. Then, the remaining sessions will be turned off or invalidated.

Further, in another embodiment, a part of the plurality of sessions may be configured as the non-preemptive session and the remaining sessions are configured as the preemptive sessions. In this case, the comparison unit 10031 further compares the number of the non-preemptive sessions with the session limit parameter when the number of current sessions is greater than the session limit parameter. When the number of the non-preemptive sessions is less than the session limit parameter, the selection unit 10032 selects all the non-preemptive sessions as a part of the optimal sessions, and then selects the preemptive sessions in an order from high priority to low priority as another part of the optimal sessions, wherein the number of the selected preemptive sessions equals to a difference between the session limit parameter and the number of the non-preemptive sessions. The remaining preemptive sessions will be limited. When the number of the non-preemptive sessions is greater than or equal to the session limit parameter, the selection unit 10032 selects all the non-preemptive sessions as the optimal sessions.

In addition, the apparatus 1000 of the present embodiment may further comprise: a queue establishing module 1004 configured to establish a plurality of session queues, wherein the plurality of session queues have the priorities corresponding to the priorities of the plurality of sessions; and a session adding module 1005 configured to add the sessions into the plurality of session queues with the corresponding priorities respectively. In this case, the selection unit 10032 begins the selection from the session queue with the highest priority, and within the same session queue, the session that enters into the session queue earlier will be preferably selected.

It should be noted that the apparatus 1000 of the present embodiment for managing a plurality of sessions in a Multi-Path Routing based network is operable to implement the method of managing a plurality of sessions in a Multi-Path Routing based network shown in FIGS. 3-9.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing a plurality of sessions, the method comprising:
    advertising, by a node establishing the plurality of sessions, a session limit capability to peer nodes for the plurality of sessions;
    determining and setting priorities of the plurality of sessions, each determined priority of an individual session of the plurality of sessions being based on a stability of the individual session which takes into account flapping, wherein more stable sessions have a higher priority set than less stable sessions which have a lower priority set; and
    selecting at least one optimal session from the plurality of sessions based on a session limit parameter and the determined priorities of the plurality of sessions, wherein the session limit parameter indicates a number of acceptable sessions for the node establishing the plurality of sessions, and
    wherein a number of sessions in the at least one optimal session is equal to or less than the session limit parameter.

2. The method according to claim 1, wherein the advertising, by the node establishing the plurality of sessions, the session limit capability to the peer nodes for the plurality of sessions comprises:
    sending to the peer nodes a session limit capability message including at least an indicator indicating the session limit capability;
    receiving one or more responses to the session limit capability message from the peer nodes;
    performing general session management on a first session in reaction to a first response from a first peer node associated with the first session being negative indicating that the first peer does not support the session limit capability; and
    recording a second peer node and a second session thereof in reaction to a second response from the second peer node associated with the second session being positive indicating that the second peer supports the session limit capability, and
    wherein the session limit capability message comprises a code field uniquely indicating the session limit capability and a current session field indicating an actual number of currently established sessions.

3. The method according to claim 1, wherein the determining priorities of the plurality of sessions comprises:
    monitoring states of the plurality of sessions; and
    modifying the priorities of the plurality of sessions based on a change in the states of the plurality of sessions.

4. The method according to claim 3, wherein the monitoring states of the plurality of sessions comprises:
    monitoring whether a flapping occurs in the plurality of sessions.

5. The method according to claim 4, wherein the modifying the priorities of the plurality of sessions based on the change in the states of the plurality of sessions comprises:
    decreasing, when it is monitored that the flapping occurs in a session of the plurality of sessions, the priority of the session; and
    increasing, when it is monitored that a flapping does not occur in a session of the plurality of sessions for a predetermined time period, the priority of the session.

6. The method according to claim 1, wherein the selecting the at least one optimal session from the plurality of sessions based on the session limit parameter indicative of the number of acceptable sessions and the determined priorities of the plurality of sessions comprises:
    comparing a number of current sessions with the session limit parameter, each session comprising a connection between two nodes and information exchange therebetween;

selecting all current sessions as the at least one optimal session in response to a determination that the number of current sessions is less than or equal to the session limit parameter; and selecting sessions from the current sessions in an order from high priority to low priority in response to a determination that the number of current sessions is greater than the session limit parameter, wherein a number of current sessions selected as the at least one optimal session is equal to the session limit parameter.

7. The method according to claim 1, wherein a part of the plurality of sessions is configured as a non-preemptive session and another part of the plurality of sessions is configured as a preemptive session, and wherein the plurality of sessions are selected from a group consisting of: Equal Cost Multi-Path (ECMP) sessions and Weighted Cost Multi-Path (WCMP) sessions.

8. The method according to claim 7, wherein the selecting the at least one optimal session from the plurality of sessions based on the session limit parameter indicative of the number of acceptable sessions and the determined priorities of the plurality of sessions comprises:

comparing a number of current sessions with the session limit parameter;

selecting all current sessions as the at least one optimal session in response to a determination that the number of current sessions is less than or equal to the session limit parameter;

comparing a number of the non-preemptive sessions with the session limit parameter in response to a determination that the number of current sessions is greater than the session limit parameter;

selecting the non-preemptive sessions and the preemptive sessions as the at least one optimal session in an order from highest priority to lowest priority in response to a determination that the number of the non-preemptive sessions is less than the session limit parameter, wherein the number of the selected preemptive sessions equals a difference between the session limit parameter and the number of the non-preemptive sessions;

selecting the non-preemptive sessions as the at least one optimal session in response to a determination that the number of the non-preemptive sessions is equal to the session limit parameter, wherein the number of the selected non-preemptive sessions is equal to the session limit parameter; and selecting the non-preemptive sessions as the at least one optimal session in response to a determination that the number of the non-preemptive sessions is greater than or equal to the session limit parameter, wherein all of the non-preemptive sessions are selected as the at least one optimal session and the session limit parameter is increased to equal the number of the selected non-preemptive sessions.

9. The method according to claim 1, wherein a part of the plurality of sessions is configured as a non-preemptive session and another part of the plurality of sessions is configured as a preemptive session, the method further comprising:

establishing a plurality of session queues, the plurality of session queues having priorities corresponding to the priorities of the plurality of sessions, at least one of the session queues being configured to store only non-preemptive sessions, and at least one of the session queues being configured to store only preemptive sessions;

adding the sessions with the corresponding priorities and preemptive status respectively into the plurality of session queues;

monitoring states of the plurality of sessions including whether a flapping occurs in at least one of the plurality of sessions; and modifying the priorities of the plurality of sessions based on a change in the states of the plurality of sessions on an individual basis, comprising:

decreasing incrementally, in response to a determination that the flapping has occurred within a predetermined time period in a first session of the plurality of sessions, the priority of the first session; and increasing, in response to a determination that the flapping has not occurred in a second session of the plurality of sessions for the predetermined time period, the priority of the second session.

10. An apparatus for managing a plurality of sessions in a Multi-Path Routing based network, the apparatus comprising:

a hardware processor configured to operate a plurality of modules, each module comprising one or more executable instructions that when executed by the processor implement a specified logical function, the modules comprising:

an advertisement module configured to advertise a session limit capability to peer nodes for the plurality of sessions;

a priority determination module configured to determine and set priorities of the plurality of sessions, each determined priority of an individual session of the plurality of sessions being based on a stability of the individual session which takes into account flapping, wherein more stable sessions have a higher priority set than less stable sessions which have a lower priority set; and a selection module configured to select at least one optimal session from the plurality of sessions based on a session limit parameter and the determined priorities of the plurality of sessions, wherein the session limit parameter indicates a number of acceptable sessions for the node establishing the plurality of sessions, and wherein a number of sessions in the at least one optimal session is equal to or less than the session limit parameter.

11. The apparatus according to claim 10, wherein the advertisement module comprises one or more units, each unit comprising one or more executable instructions that when executed by the processor implement a specified logical function, the units comprising:

a sending unit configured to send to the peer nodes a session limit capability message at least including an indicator indicating the session limit capability;

a receiving unit configured to receive one or more responses to the session limit capability message from the peer nodes; and a recording unit configured to record a first peer node and a first session thereof in reaction to a first response from the first peer node associated with the first session being positive indicating that the first peer supports the session limit capability, wherein general session management is performed on a second session in reaction to a second response from a second peer node associated with the second session being negative indicating that the second peer does not support the session limit capability, and wherein the session limit capability message comprises a code field uniquely indicating the session limit capability and a current session field indicating an actual number of currently established sessions.

12. The apparatus according to claim 10, wherein the priority determination module comprises one or more units, each unit comprising one or more executable instructions that when executed by the processor implement a specified logical function, the units comprising:
a monitoring unit configured to monitor states of the plurality of sessions; and
a priority modifying unit configured to modify the priorities of the plurality of sessions based on a change in the states of the plurality of sessions.

13. The apparatus according to claim 12, wherein the monitoring unit is configured to monitor whether a flapping occurs in the plurality of sessions.

14. The apparatus according to claim 13, wherein the priority modifying unit is configured to:
decrease, when it is monitored by the monitoring unit that the flapping occurs in a session of the plurality of sessions, the priority of the session; and
increase, when it is monitored by the monitoring unit that the flapping is not occurred in a session of the plurality of sessions for a predetermined time period, the priority of the session.

15. The apparatus according to claim 10, wherein the selection module comprises one or more units, each unit comprising one or more executable instructions that when executed by the processor implement a specified logical function, the units comprising:
a comparison unit configured to compare a number of current sessions with the session limit parameter; and
a selection unit configured to select all current sessions as the at least one optimal session in response to a determination that the number of current sessions is less than or equal to the session limit parameter, and to select sessions from the current sessions, the number of which equals the session limit parameter, as the at least one optimal session in an order from highest priority to lowest priority in response to a determination that the number of current sessions is greater than the session limit parameter.

16. The apparatus according to claim 10, wherein a part of the plurality of sessions is configured as a non-preemptive session and another part of the plurality of sessions is configured as a preemptive session.

17. The apparatus according to claim 10, wherein the selection module comprises one or more units, each unit comprising one or more executable instructions that when executed by the processor implement a specified logical function, the units comprising:
a comparison unit configured to compare a number of current sessions with the session limit parameter, and to compare a number of non-preemptive sessions with the session limit parameter in response to a determination that the number of current sessions is greater than the session limit parameter; and
a selection unit configured to:
select all current sessions as the at least one optimal session in response to a determination that the number of current sessions is less than or equal to the session limit parameter,
select the non-preemptive sessions and preemptive sessions as the at least one optimal session in an order from highest priority to lowest priority in response to a determination that the number of the non-preemptive sessions is less than the session limit parameter, wherein a number of selected preemptive sessions equals a difference between the session limit parameter and the number of the non-preemptive sessions,
select the non-preemptive sessions as the at least one optimal session in response to a determination that the number of the non-preemptive sessions is equal to the session limit parameter, wherein a number of selected non-preemptive sessions is equal to the session limit parameter; and
select the non-preemptive sessions as the at least one optimal session in response to a determination that the number of the non-preemptive sessions is greater than or equal to the session limit parameter, wherein all of the non-preemptive sessions are selected as the at least one optimal session and the session limit parameter is increased to equal the number of the non-preemptive sessions.

18. The apparatus according to claim 10, wherein the modules further comprise:
a queue establishing module configured to establish a plurality of session queues, the plurality of session queues having priorities corresponding to the priorities of the plurality of sessions, at least one of the session queues being configured to store only non-preemptive queues, and at least one of the session queues being configured to store only preemptive queues; and
a session adding module configured to add the sessions into the plurality of session queues with the corresponding priorities respectively.

* * * * *